(Model.)
C. W. FRICK.
EVAPORATING PAN AND FURNACE.
No. 310,403. Patented Jan. 6, 1885.
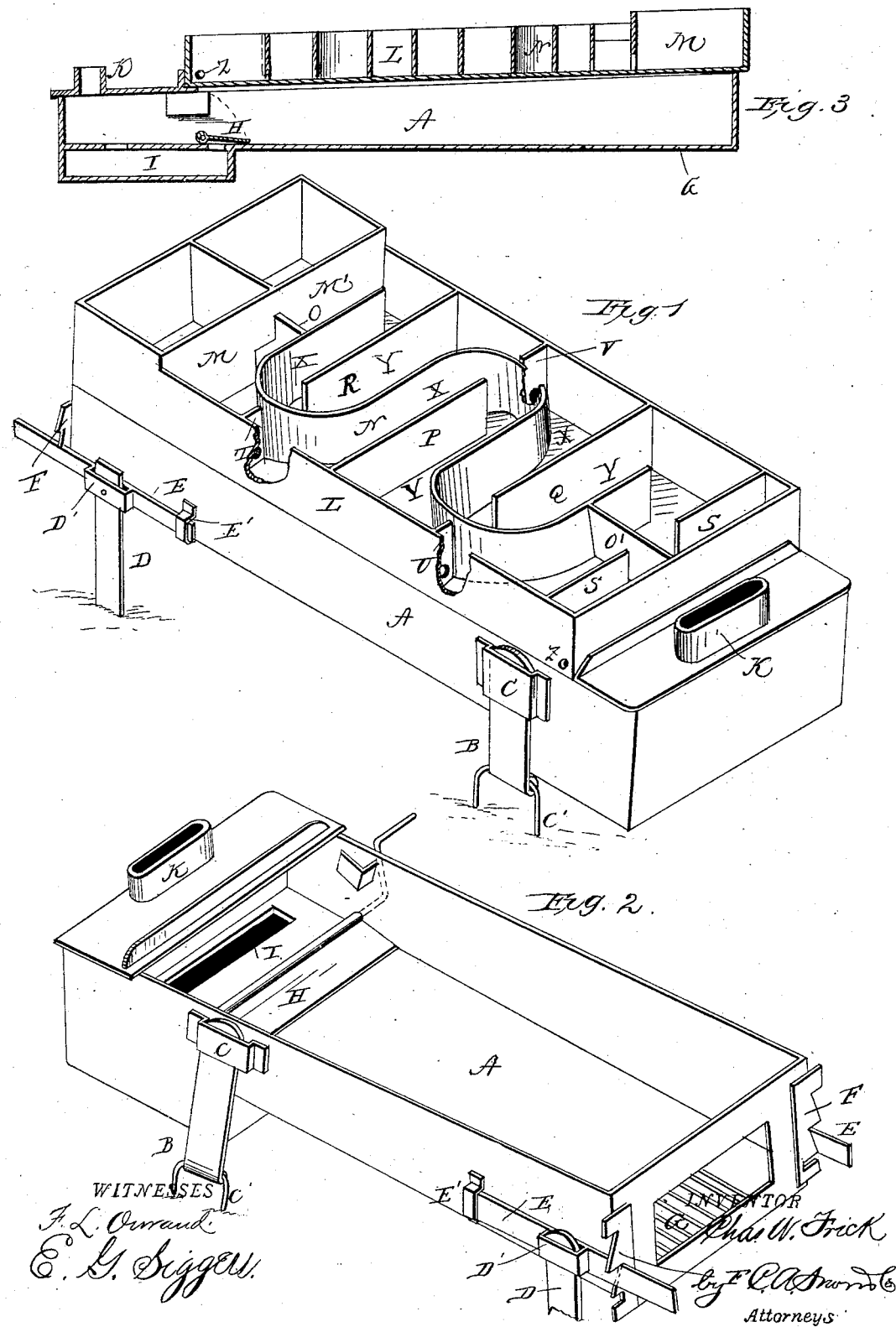

UNITED STATES PATENT OFFICE.

CHARLES WILLIAM FRICK, OF HECKER, ILLINOIS.

EVAPORATING PAN AND FURNACE.

SPECIFICATION forming part of Letters Patent No. 310,403, dated January 6, 1885.

Application filed April 28, 1884. (Model.)

*To all whom it may concern:*

Be it known that I, CHARLES W. FRICK, a citizen of the United States, residing at Hecker, in the county of Monroe and State of Illinois, have invented a new and useful Evaporating-Pan, of which the following is a specification, reference being had to the accompanying drawings.

This invention has relation to evaporating-pans used in making sugar; and it consists in the construction and novel arrangement of parts, as will be hereinafter fully described, and particularly pointed out in the claims.

Figure 1 is a view in perspective of a furnace with my evaporating-pan in place thereon; Fig. 2 is a perspective view of the furnace with the pan removed; and Fig. 3 is a vertical longitudinal sectional view of Fig. 1.

Referring by letter to the accompanying drawings, A designates the furnace, which is mounted on legs B, near its rear end, which legs are pivoted in brackets C on the sides of the furnace, and provided with feet C' and legs D at the front end, the upper ends of which legs are pivoted in brackets D' on the outer faces of tilting levers E E, fulcrumed in brackets E' at the sides of the furnace and engaging racks F F at the front corners of the same.

G designates the fire-grate; H, the damper; I, a deflecting or dive flue, and K the smoke-stack.

L designates the evaporating-pan, which rests upon the furnace, and is a double pan, so that two lots of juice may be cooked at one time. M M' designate the compartments where the juice is first poured in immediately over the fire.

N designates a longitudinal serpentine partition, which extends from a vertical partition, O, at one end of the pan to a similar partition, O', at the other end, forming U-shaped compartments on opposite sides of the pan.

P Q R are long transverse partitions extending across the bottom of the pan nearly to the serpentine partition, so as to subdivide the U-shaped compartments into two smaller chambers, X Y, which have free communication with each other, as will be seen.

S S are shorter partitions at the rear end of the pan, extending across nearly to the vertical partition O', and T U V are still shorter partitions, which connect the serpentine partitions to the sides of the pan, said partitions T U V being provided with openings to allow free passage of the juice.

As will be understood, the liquid flows from the compartments M M' through openings near the bottom of the inner transverse walls of the same, and by means of the partition O the juice from the compartment M is deflected down one side of the partition N, and that from the other compartment, M', down the other side into and through the compartments X Y, and so on along the entire length of the pan, the juice thus having a winding sinuous course from one end of the pan to the other, retarding the direct flow of the same, and thus enabling a more perfect evaporation to be effected, the sugar discharging or escaping through openings Z at the rear corners of the pan, the inclination given to the latter causing the flow to be regular, as aforesaid.

When it is desired to cool the evaporating-pan at the point where the sugar is formed, the damper is turned up and the flame passes down into the dive-flue, and from thence into the smoke-stack. By the use of the pivoted legs and tilting levers and racks, the inclination of the furnace and pan may be regulated, and they can also be reciprocated back and forth instead of being rocked.

The device is cheap, simple, and durable, and is not likely to get out of order.

I would have it understood that I lay no claim to the furnace herein shown and described.

Having thus fully described my invention, what I claim as new, and desire to secure by Letters Patent of the United States, is—

1. The herein-described evaporating-pan, adapted to cook two lots of juice at one time, comprising the two compartments M M' at one end, vertical partitions O O' at each end, projecting out in the center, a longitudinal serpentine partition, N, which extends from one partition, O, to the other, O', forming U-shaped compartments on opposite sides of the pan, and long transverse partitions arranged across the bottom of the pan nearly to the serpentine partition, so as to subdivide the U-shaped compartments into two smaller communicating chambers, so that the juice will have a winding sinuous course from one end of the pan to the other, retarding the direct flow of the juice, and thus enabling a more perfect evaporation to be effected, as and for the purpose set forth.

2. The herein-described evaporating-pan, adapted to cook two lots of juice at one time, comprising the two compartments M M' at one end, vertical partitions O O' at each end arranged in the center of the pan, a longitudinal serpentine partition, N, which extends from one partition, O, to the other, O', forming U-shaped compartments on opposite sides of the pan, long transverse partitions P Q R, extending across the bottom of the pan nearly to the serpentine partition N, so as to subdivide the U-shaped compartments into smaller compartments X Y, short transverse partitions T U V, connecting with the central partition, N, and partitions S at the rear end of the pan extending nearly to the vertical partition O', arranged and operating as and for the purpose set forth.

In testimony that I claim the foregoing as my own I have hereto affixed my signature in presence of two witnesses.

CHARLES WM. FRICK.

Witnesses:
 JOSEPH KLINKHARDT,
 JOHN S. SENNOTT.